United States Patent
Wormser et al.

(10) Patent No.: US 11,193,074 B2
(45) Date of Patent: Dec. 7, 2021

(54) ALL-STEAM GASIFICATION WITH CARBON CAPTURE

(71) Applicant: Wormser Energy Solutions, Inc., Lancaster, MA (US)

(72) Inventors: Alex Wormser, Atlanta, GA (US); John Parkes, Los Altos, CA (US); Douglas M. Todd, Galway, NY (US)

(73) Assignee: Wormser Energy Solutions, Inc., Lancaster, MA (US)

(*) Notice: Subject to any disclaimer, the term of this patent is extended or adjusted under 35 U.S.C. 154(b) by 0 days.

(21) Appl. No.: 16/559,216

(22) Filed: Sep. 3, 2019

(65) Prior Publication Data

US 2020/0002631 A1 Jan. 2, 2020

Related U.S. Application Data

(62) Division of application No. 15/227,137, filed on Aug. 3, 2016, now Pat. No. 10,443,005.

(Continued)

(51) Int. Cl.
*C10J 3/66* (2006.01)
*C10G 2/00* (2006.01)
(Continued)

(52) U.S. Cl.
CPC .................. *C10J 3/66* (2013.01); *C01B 3/38* (2013.01); *C10B 49/10* (2013.01); *C10G 2/30* (2013.01);
(Continued)

(58) Field of Classification Search
CPC ........ C10J 2300/1215; C10J 3/62; C10J 3/66; C10J 2300/0993
See application file for complete search history.

(56) References Cited

U.S. PATENT DOCUMENTS 3,373,562 A 3/1968 Wormser
4,003,691 A 1/1977 Wormser
(Continued)

FOREIGN PATENT DOCUMENTS

CN 101235321 A 8/2008
CN 203096004 U 7/2013
(Continued)

OTHER PUBLICATIONS

"Notification to Grant" for Chinese Patent Application No. ZL 201680046075.0, dated Sep. 14, 2020, 2 pages, China National Intellectual Property Administration, People's Republic of China.
(Continued)

*Primary Examiner* — Matthew J Merkling
(74) *Attorney, Agent, or Firm* — Rauschenbach Patent Law Group, LLC; Kurt Rauschenbach

(57) ABSTRACT

A carbonaceous fuel gasification system for all-steam gasification with carbon capture includes a micronized char preparation system comprising a devolatilizer that receives solid carbonaceous fuel, hydrogen, oxygen, and fluidizing steam and produces micronized char, steam, volatiles, hydrogen, and volatiles at outlets. An indirect gasifier includes a vessel comprising a gasification chamber that receives the micronized char, a conveying fluid, and steam. The gasification chamber produces syngas, ash, and steam at one or more outlets. A combustion chamber receives a mixture of hydrogen and oxidant and burns the mixture of hydrogen and oxidant to provide heat for gasification and for heating incoming flows, thereby generating steam and nitrogen. The heat for gasification is transferred from the combustion chamber to the gasification chamber by circulating refractory sand. The system of the present teaching produces nitrogen free high hydrogen syngas for applications such as IGCC with CCS, CTL, and Polygeneration plants.

21 Claims, 9 Drawing Sheets

Related U.S. Application Data

(60) Provisional application No. 62/329,632, filed on Apr. 29, 2016, provisional application No. 62/201,625, filed on Aug. 6, 2015.

(51) Int. Cl.
  *C10J 3/48* (2006.01)
  *C10B 49/10* (2006.01)
  *C10K 3/04* (2006.01)
  *C01B 3/38* (2006.01)

(52) U.S. Cl.
  CPC ............... *C10J 3/482* (2013.01); *C10K 3/04* (2013.01); *C01B 2203/0283* (2013.01); *C01B 2203/045* (2013.01); *C01B 2203/0465* (2013.01); *C01B 2203/0485* (2013.01); *C01B 2203/1058* (2013.01); *C01B 2203/84* (2013.01); *C10J 2200/152* (2013.01); *C10J 2300/0906* (2013.01); *C10J 2300/0993* (2013.01); *C10J 2300/1215* (2013.01); *C10J 2300/1246* (2013.01); *C10J 2300/165* (2013.01); *C10J 2300/1606* (2013.01); *C10J 2300/1612* (2013.01); *C10J 2300/1618* (2013.01); *C10J 2300/1659* (2013.01); *C10J 2300/1662* (2013.01); *C10J 2300/1665* (2013.01); *C10J 2300/1675* (2013.01); *C10J 2300/1687* (2013.01); *C10J 2300/1853* (2013.01); *Y02E 20/18* (2013.01)

(56) References Cited

U.S. PATENT DOCUMENTS

| | | | |
|---|---|---|---|
| 4,013,395 | A | 3/1977 | Wormser |
| 4,051,791 | A | 10/1977 | Wormser |
| 4,135,885 | A | 1/1979 | Wormser et al. |
| 4,149,559 | A | 4/1979 | Wormser |
| 4,253,409 | A | 3/1981 | Wormser |
| 4,279,205 | A | 7/1981 | Perkins et al. |
| 4,279,207 | A | 7/1981 | Wormser |
| 4,303,023 | A | 12/1981 | Perkins et al. |
| 4,322,222 | A * | 3/1982 | Sass ............... C10J 3/62 48/197 R |
| 4,499,857 | A | 2/1985 | Wormser |
| 4,578,175 | A | 3/1986 | Gorin |
| 5,122,346 | A | 6/1992 | Wormser |
| 5,296,005 | A * | 3/1994 | Wolfe ............ C10B 7/10 44/281 |
| 5,655,853 | A | 8/1997 | Wormser |
| 5,997,220 | A | 12/1999 | Wormser |
| 6,877,322 | B2 | 4/2005 | Fan |
| 9,174,844 | B2 | 11/2015 | Ramkumar et al. |
| 2002/0117564 | A1 | 8/2002 | Hahn et al. |
| 2004/0045272 | A1 | 3/2004 | Miyoshi et al. |
| 2004/0237404 | A1 | 12/2004 | Andrus et al. |
| 2008/0244976 | A1* | 10/2008 | Paisley ............ C10J 3/482 48/62 R |
| 2010/0181539 | A1 | 7/2010 | Apanel et al. |
| 2010/0329963 | A1 | 12/2010 | Sceats et al. |
| 2012/0164032 | A1 | 6/2012 | Wormser |
| 2012/0167585 | A1 | 7/2012 | Wormser |
| 2012/0247080 | A1 | 10/2012 | Ishii et al. |
| 2012/0267577 | A1 | 10/2012 | Sceats et al. |
| 2014/0158939 | A1 | 6/2014 | Ramkumar et al. |
| 2014/0296586 | A1 | 10/2014 | Chandran et al. |
| 2014/0352581 | A1 | 12/2014 | Abanades Garcia et al. |

FOREIGN PATENT DOCUMENTS

| | | |
|---|---|---|
| EP | 0067580 A1 | 12/1982 |
| EP | 2484971 A1 | 8/2012 |
| WO | 0250214 A2 | 6/2002 |
| WO | 2011035241 A1 | 3/2011 |
| WO | 2013062800 A1 | 5/2013 |
| WO | 2013-109616 A1 | 7/2013 |

OTHER PUBLICATIONS

"Notification Of Transmittal Of The International Search Report And The Written Opinion Of The International Searching Authority, Or The Declaration" for International Patent Application No. PCT/US2016/055602, dated Jan. 11, 2017, 13 pages, International Searching Authority/KR, Korean Intellectual Property Office, Daejeon, Republic of Korea.

"Notification of the Transmittal of the International Search Report and the Written Opinion of the International Searching Authority, or the Declaration", For International Patent Application No. PCT/US2018/013317, dated Apr. 30, 2018, 10 Pages, Korean Intellectual Property Office ISA/KR, Daejeon, Republic of Korea.

Search Report for European Patent Application No. 16833770.7, dated Dec. 11, 2018, 12 Pages, European Patent Office, Munich, Germany.

Rietveld, et al. Commercialization of the ECN MILENA Gasification Technology, Jun. 2014, 21 pages.

Twin IHI Gasifier (TIGAR®), Current Status of Indonesian Demonstration Project and its Business Plan, Oct. 18, 2016, 19 pages, IHI Corporation, Vancouver, Canada.

"Notification Concerning Transmittal of International Preliminary Report on Patentability (Chapter I of the Patent Cooperation Treaty)", for International Patent Application No. PCT/US2016/045268, dated Feb. 15, 2018, 6 Pages, The International Bureau of WIPO, Geneva, Switzerland.

Butler, "Limestone as a Sorbent for CO2 Capture and its Application in Enhanced Biomass Gasification", Oct. 2013, 279 Pages, The University of British Colombia, Vancouver, Canada.

"First Examination Report" for India Patent Application No. 201817001995, dated Feb. 24, 2020, 4 pages, Intellectual Property India, New Delhi, India.

"First Office Action" for Chinese Patent Application No. 201680046075.0, dated Jan. 2, 2020, 5 pages, China National Intellectual Property Administration, China.

"Notification Of Transmittal Of The International Search Report And The Written Opinion Of The International Searching Authority, Or The Declaration" for International Patent Application No. PCT/US2016/045268, dated Nov. 10, 2016, 9 pages, International Searching Authority/KR, Korean Intellectual Property Office, Daejeon, Republic of Korea.

"Notification Concerning Transmittal of International Preliminary Report on Patentability (Chapter I of the Patent Cooperation Treaty)", For International Patent Application No. PCT/US2016/055602, dated Apr. 19, 2018, 9 Pages, International Bureau of WIPO, Geneva, Switzerland.

* cited by examiner

ALL-STEAM GASIFICATION WITH CARBON CAPTURE

CROSS REFERENCE TO RELATED APPLICATION

The present application is a divisional of U.S. patent application Ser. No. 15/227,137 entitled "All-Steam Gasification with Carbon Capture" filed on Aug. 3, 2016, which is a non-provisional application of U.S. Provisional Patent Application No. 62/201,625 entitled "Carbon Capture with All-Steam Gasification" filed on Aug. 6, 2015 and U.S. Provisional Patent Application No. 62/329,632 entitled "All-Steam Gasification with Carbon Capture" filed on Apr. 29, 2016. The entire contents of U.S. patent application Ser. No. 15/227,137 and U.S. Provisional Patent Applications Nos. 62/201,625 and 62/329,632 are herein incorporated by reference.

INTRODUCTION

The section headings used herein are for organizational purposes only and should not be construed as limiting the subject matter described in the present application in any way.

Global warming concerns about $CO_2$ greenhouse gas accumulation in the atmosphere continue to grow. Atmospheric concentrations of $CO_2$ are higher now than in any of the last several hundred thousand years. $CO_2$ emissions from fossil fuel energy generation systems are a major culprit in the recent few decades of increasing $CO_2$ in the atmosphere. At the same time, the demand for and use of fossil fuels worldwide continues to grow. Even with major increases in renewables and nuclear energy sources, the growth of fossil fuel consumption continues to rise. As such, there is a significant need for efficient and effective low-carbon technologies, especially for power generation and chemical production.

Integrated gasification combined cycle (IGCC) technology is the cleanest way to make energy from coal. Gasification results in significantly fewer pollutants than produced by conventional coal power plants. An IGCC power plant burns syngas in a turbine to produce electricity. The excess heat is captured to power a second turbine that produces more electricity, resulting in high-efficiency power generation. Gasification of various solid fuels to produce chemicals including fertilizers, methanol, diesel fuel, and many other chemicals is common today. Gasification is beneficial to the environment, resulting in less pollution, reduced carbon dioxide emission, less solid waste, and lower water use.

SUMMARY

A carbonaceous fuel gasification system includes a micronized char preparation system comprising a devolatilizer that receives solid carbonaceous fuel, hydrogen, oxygen, and fluidizing steam. The micronized char preparation system produces micronized char, steam, volatiles, and hydrogen at outlets. In some embodiments, the char preparation system includes a counter-flow char cooler that preheats steam as it cools the char, a pressure let-down valve, a pulverizer that reduces the average size of the micronized char to under 10μ, and an airlock that re-pressurizes the micronized char to the inlet. In one specific embodiment, the carbonaceous fuel is coal. In some embodiments, the devolatilizer comprises a heated pressure vessel comprising an inlet for injecting fluidizing steam, and at least one outlet for removing volatiles and coarse char.

An indirect gasifier includes a vessel comprising a gasification chamber that receives the micronized char from the micronized char preparation system, and that receives a conveying fluid, and steam. The gasification chamber may also be referred to as a gasifier. In some embodiments, the indirect gasifier receives volatiles from the outlet of the micronized char preparation system. In some embodiments, the gasification chamber receives steam from an outlet of the micronized char preparation system. Also, in some embodiments, the gasification chamber has an outlet that is coupled to an inlet of a heat recovery system so that the heat recover system receives steam from the gasification chamber. The gasification chamber produces syngas, ash, and steam at one or more outlets.

The indirect gasifier also includes a combustion chamber. The combustion chamber may also be referred to as a combustor. The combustion chamber receives a mixture of hydrogen and oxidant and burns the mixture of hydrogen and oxidant to provide heat for gasification and for heating incoming flows, thereby generating steam and nitrogen. For example, the oxidant can be air. The heat for gasification is transferred from the combustion chamber to the gasification chamber by circulating refractory sand. In some embodiments, the steam and nitrogen generated by the indirect gasifier's combustor are directed to a gas turbine power generation system. In some embodiments, the steam and nitrogen generated by the combustion chamber of the indirect gasifier are directed to an expander connected to an electrical generator, to stack condensers in a power block, and is then exhausted at a system stack.

The carbonaceous fuel gasification system can also further include a cyclone that separates course char from volatiles, where the cyclone has a first outlet that is positioned downstream of the devolatilizer that provides coarse char and a second outlet that is coupled to an input of the indirect gasifier.

The carbonaceous fuel gasification system can also further include a syngas cooler having an inlet coupled to the outlet of the gasification chamber of the indirect gasifier, where the syngas cooler cools the syngas, and generates steam at an outlet. A syngas cleanup system having an input that receives the cooled syngas from the outlet of the syngas cooler can be used to remove impurities.

A carbon capture system having an input that is coupled to the outlet of the syngas clean-up system can be used to generate carbon dioxide and hydrogen. The carbon capture system can include a carbon capture reactor having a nickel-based catalyst that enables excess methane in the syngas to be removed by steam-reforming. The carbon capture reactor uses steam to produce a water gas shift reaction. A polishing desulfurizer in the syngas cleanup system can be used to reduce the $SO_2$ concentration of the syngas to a level that protects the catalyst from being poisoned by the sulfur dioxide. The nickel-based catalyst can be mounted on the surface of a sorbent assembly.

In some embodiments, a solid fuel-to-liquids system is coupled to the outlet of the carbon capture that delivers hydrogen. The solid fuel-to-liquids system has an inlet that is coupled to the outlet of the syngas clean up system and to an outlet of the carbon capture system. The solid fuel-to-liquids system receives syngas and a stream of hydrogen and generates methane at a first output and at least one of diesel oil, methanol, gasoline, and aviation fuel at a second output. In these embodiments, the indirect gasifier receives volatiles from the output of the micronized char preparation system.

The first output of the solid fuel-to-liquids system is coupled to an input of the indirect gasifier. The solid fuel-to-liquids system provides methane to the vessel comprising the gasification chamber in the indirect gasifier. In various embodiments, a gas flow controller is positioned between the syngas clean-up system and the solid fuels-to-liquids system in order to regulate a carbon monoxide/hydrogen ratio in the syngas to the solid fuel-to-liquids system using syngas from the outlet of the syngas clean up system.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
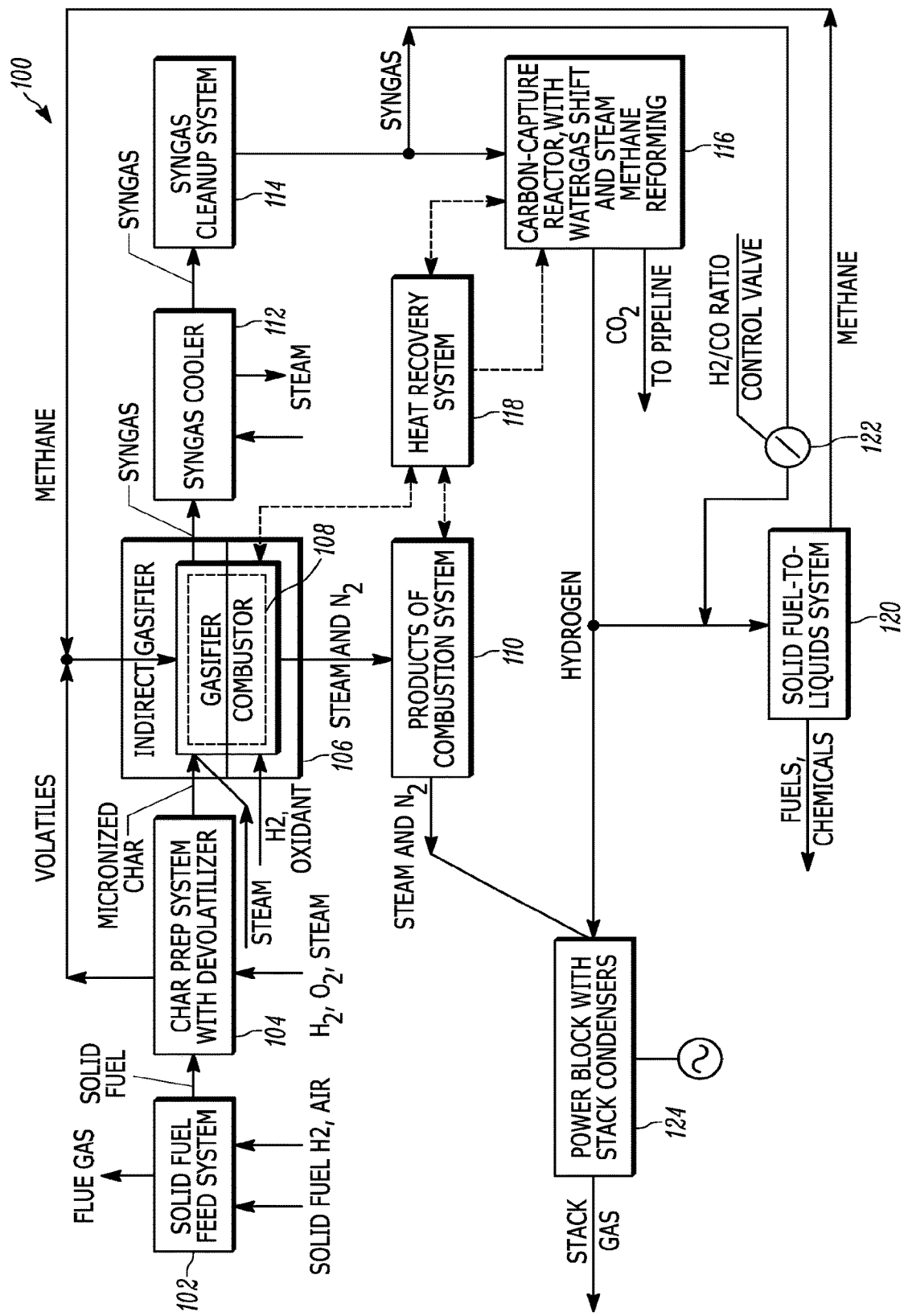
FIG. 1 illustrates a system block diagram of an all-steam gasification with carbon capture system according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Global warming and climate change issues are requiring that coal power plants world-wide add expensive controls to capture and store $CO_2$ in order to meet desired emission rates. Current technologies such as IGCC with carbon capture for coal plants have proven uneconomical without subsidies. The additional power required to run the carbon capture systems reduces efficiency, and consequently widespread adoption has not occurred. This has led to the shutdown of older coal plants and cancellation of many new plants. Still, many experts believe that coal is a valuable energy source to assist in transitioning the world to renewable energy sources.

The present teaching relates to an all-steam gasification system with carbon capture, which can substantially improve the efficiency, and hasten widespread adoption of the beneficial IGCC technology. All-steam gasification (ASG) is advantageous because it can supply a source of heat for gasification by the complete combustion of fuel. This is accomplished by using an indirect gasifier, instead of the partial oxidation of carbon into CO, which is done in conventional systems. This process more than triples the amount of net hydrogen produced per pound of carbon in the gasifier, and increases the total hydrogen, including that produced in a shift reactor, by approximately 30%. Since hydrogen is the carbon-free fuel needed with carbon capture, the increased yield of hydrogen increases Integrated Gasification Combined Cycle (IGCC) plant efficiency, from about 32% for a conventional system with carbon capture, to about 48% Higher Heating Value (HHV) with the new system. Due to unique designs in each of the subsystems, there is also an even greater reduction of cost, for both fuel and capital.

All-steam gasification has been used in, for example, combined gas and steam (COGAS), char-oil energy development (COED). Also, $CO_2$ Acceptor Process systems use steam gasification. However, these systems do not combine carbon capture applications with energy generation or coal plants of the present teaching. The efficiency with carbon capture in an all-steam gasification and carbon capture system of the present teaching is now higher than that of the most efficient coal power plants using conventional technology, without carbon capture. The all-steam gasification and carbon capture system of the present teaching applies to various types of solid fuels, such as coal and biomass.

The all-steam gasification and carbon capture system of the present teaching includes six technologies with major improvements. The all-steam gasification and carbon capture system of the present teaching produces hydrogen from coal or other feedstocks for electric power and/or production of chemicals. The all-steam gasification and carbon capture system of the present teaching produces nitrogen free high hydrogen syngas for applications such as IGCC with Carbon Capture Storage (CCS), Coal-to-Liquids (CTL) and Polygeneration plants. Polygeneration, as used herein, is a term used to describe its multi-product capability. The all-steam gasification and carbon capture system of the present teaching provides higher efficiency with costs that are low enough to make coal competitive in a carbon-constrained world. The combined improvements in key subsystem of the all-steam gasification and carbon capture system of the present teaching produces power and polygeneration with the necessary economics for world-wide competitiveness while addressing Global Warming.

In addition, all-steam gasification produces a much larger quantity of hydrogen per pound of coal or other feedstock compared with other known methods. Air blown methods eliminate the large expensive air separation plant for producing oxygen, normally used for such systems, significantly improving efficiency and cost. An indirect gasifier enables nitrogen-free hydrogen necessary for polygeneration of liquids and chemicals while maintaining power-only and CTL-only-modes by keeping air from mixing with the critical streams.

Furthermore, the use of micronized char produced in a devolatilizer and in a char preparation system enables gasification of the feedstock in seconds. This significantly reduces the gasification plant size and provides increased capacity in modularized equipment. An adiabatic calcium looping with integral water gas shift, using high temperature fixed beds and limestone-based sorbents enhances the overall carbon capture system. The result is pipeline-quality, high-pressure CO2. The high-temperature process enables heat from a shift reactor to be recovered at high temperature. This produces much more steam than a lower-temperature shift used in prior art conventional shift systems.

Such systems avoid the need for steam to regenerate the sorbents used to capture carbon dioxide. Integrated high temperature heat recovery systems using specialized high temperature heat exchangers support the overall system with very high efficiency. Finally, such systems utilize known warm-gas clean-up systems that produce near-zero emissions, easing air pollution while reducing temperature cycling. Adding a warm-gas clean-up system leverages the normal capability of syngas cleanup at higher temperature.

FIG. 1 illustrates a system block diagram of an all-steam gasification with carbon capture system 100 according to the present teaching. The all-steam gasification with carbon capture system 100 is suitable for use in polygeneration. In polygeneration, either power or chemicals or both are made from solid fuels, such as coal. Although many aspects of the present teaching are described in connection with the use of coal, one skilled in the art will appreciate that the present teaching is not limited to coal and that numerous other solid fuels can also be used. For example biomass, peat, wood, wood pellets and charcoal can be used.

The embodiment of the all-steam gasification with carbon capture system 100 shown in FIG. 1 includes a coal feed system 102 that takes in coal, $H_2$ and air, and emits flue gas. Some embodiments of the coal feed system 102 use a rotary valve feeder and a fluid bed coal drier with a mixer. The coal feed system 102 provides solid fuel to a char preparation system 104. The char preparation system 104 includes a devolatilizer, char cooler/steam heater, let-down valve, pulverizer, electrostatic separator, air lock and syngas char conveyer.

One feature of the present teaching is the production of micronized char that advantageously speeds the gasification process and reduces system contamination. The char preparation system 104 prepares micronized char from the coal received from the coal feed system 102, and transfers it to the indirect gasifier 106. To produce micronized char from embodiments of the char preparation system that use coal, the char preparation system 104 receives crushed coal with a size suitable for fluidization. In some embodiments, the fluidization size is less than ¼-inch. Then the crushed coal is micronized.

Although it is possible to gasify coal directly without using a char preparation system 104, it is preferable in some systems to first convert the coal into char and then gasify the char. This is because char is much more brittle than coal since most of the interior of the coal particles have been hollowed out by pyrolysis. Pyrolysis produces char particles with a range of geometries. Char particle geometry may comprise a thin-shell sphere. The char particle geometry may also be similar to Swiss cheese. The hollowed-out geometry causes char particles to break into far smaller pieces when pulverized than coal. Particles below eight microns are readily achieved. Some particles of pulverized char are ten-times smaller in diameter, and 1000-times smaller in volume, than pulverized coal. The small size of pulverized char particles hastens gasification.

A second feature of using micronized char of the present teaching is that it is non-wetting, although the ash may be sticky. Micronized char is non-wetting because the particles remain entrained in the gases in which they flow, rather than colliding with each other or other surfaces. The non-wetting feature avoids the fouling, clinkering, agglomeration, and corrosion common in prior art coal-fired power systems using pulverized coal as the solid fuel.

The indirect gasifier 106 of the present teaching produces syngas from the micronized char. Prior art indirect gasifiers have been used principally to make methane from biomass. As illustrated in FIG. 1, the heat for the reactions in indirect gasifier 106 is created by combustion in one chamber, and gasification in the other chamber of a gasifier/combustor 108. The combustion chamber of the gasifier/combustor 108 may also be referred to as a combustor. The gasifier chamber of the gasifier/combustor 108 may also be referred to as a gasifier. The gases emerging from each chamber are kept separated. The heat transfer between the chambers required for gasification is provided by circulating hot solids. The hot solids are heated in the combustor and cooled by gasification in the gasifier. In some embodiments, the hot circulating solid is flowing refractory sand.

One feature of using an indirect gasifier 106 of the present teaching is that it makes all-steam gasification (ASG) possible. Furthermore, indirect gasification eliminates the need for an oxygen plant, also known as an air separation unit (ASU) for fuels production. This is because the products of combustion are kept separate from the syngas, thereby avoiding the contamination of the syngas by nitrogen in the combustion air. Indirect gasification creates an improvement in both the efficiency and the costs of gasification systems used to produce chemicals. An additional important feature of using the indirect gasifier 106 of the present teaching is that the use of hydrogen in the combustion chamber for providing gasification heat by complete combustion allows all the carbon in the coal to be used to produce the maximum amount of hydrogen per pound of coal.

The indirect gasifier 106 takes in steam and micronized char from the char preparation system 104. The indirect gasifier 106 also takes in oxidants and $H_2$. The indirect gasifier also uses volatiles and methane provided by the char preparation system 104. The indirect gasifier 106 produces steam and nitrogen as combustion system products 110. The indirect gasifier produces syngas that is provided to a syngas cooler 112. The syngas cooler 112 cools hot syngas leaving the indirect gasifier 106 to the temperature required by the syngas cleanup system 114. The syngas cleanup system removes pollutants and sends the syngas to a carbon-capture reactor 116. The carbon-capture reactor 116 produces $CO_2$ that is sent to a pipeline. The carbon-capture reactor 116 also produces hydrogen and/or high-hydrogen syngas.

One feature of the present teaching is the efficient reuse of heat in the system. An integrated high temperature heat recovery system 118 provides the steam heating for the large amount of gasifier steam and also provides throttle steam for a steam turbine used for power generation. The heat recovery system 118 efficiently recovers the high temperature heat from the water gas shift reaction in the carbon-capture reactor 116. In various embodiments, the heat recovery system 118 can be optimized for various applications. In some embodiments, the indirect gasifier 106 uses heat provided by the heat recovery system 118. In some embodiments, the carbon-capture reactor 116 uses heat provided by the heat recovery system 118. The heat recovery system 118 efficiently recovers and reuses heat from the high-temperature systems in the all-steam gasification with carbon capture system 100 of the present teaching. Some embodiments of the heat recovery system 118 combine a char cooler, combustor products, hydrogen cooler, $CO_2$ cooler, syngas cooler, warm gas clean up unit heat exchangers, and gas turbine heat recovery steam generator.

One feature of the present teaching is the ability to produce chemicals, such as liquid fuels, methanol, ammonia, and urea, in addition to providing power. Hydrogen and/or high hydrogen syngas produced by the carbon-capture reactor 116 is sent to a coal-to-liquids system 120. In some embodiments, the coal-to-liquids system 120 uses a conventional Fischer Tropsch converter. One skilled in the art will appreciate that in embodiments of the all-steam gasification with carbon capture system of the present teaching in which the solid-fuel is not coal, a solid-fuel-to-liquids system is used instead of a coal-to-liquids system 120.

In some embodiments, the coal-to-liquids system 120 advantageously provides an additional adjustment of the hydrogen-to-carbon-monoxide ratio by controlling the bypass around the carbonator in the carbon-capture reactor 116 using a control valve 122. This bypass control adjusts the hydrogen-to-carbon-monoxide ratio accommodates the chemical requirements of the particular chemical being produced. The more bypassed gas, the higher the CO to $H_2$ ratio, and vice versa. The methane may be recycled to the carbon-capture reactor 116 where it is steam-reformed into hydrogen. This recycling of the methane from the solid-fuels-to-liquids system 120 eliminates the costly separation techniques normally required, such as cryogenic cooling, to remove the methane from the product. The high hydrogen syngas produced by the carbon-capture reactor may be used in the same way as any other fuel in a combined cycle.

In some embodiments of the system of the present teaching, the hydrogen from the carbon-capture reactor is also sent to a power block 124. The power block 124 of the present teaching uses a stack condenser for the stack gas that advantageously recovers the moisture created by the combustion of the hydrogen. The power block 124 advantageously uses steam and $N_2$ from the products of combustion 110. Because the amount of steam for gasification is large, the stack condensers provide a system with very low water use compared to conventional IGCCs. Condensation is made feasible by the very low sulfur dioxide in the syngas due to the high efficiency of the syngas cleanup system 114. The very low sulfur dioxide content syngas advantageously eliminates the corrosion of the stack that would otherwise occur. The power block 124 of the present teaching also features a larger-sized steam turbine to accommodate the many steam sources other than the gas turbine heat recovery steam generator.

Air extraction from a gas turbine for process air flows is used in prior-art conventional integrated gasification combined cycle (IGCC). The optimal amount of air extraction depends on economic and operating considerations. Some embodiments of the power block 124 of the present teaching use a different amount of air extraction as compared to prior art power blocks. This is because the present teaching uses hydrogen as the principal fuel and products of combustion system 110 flows of steam and nitrogen are returned to the gas turbine in the power block 124. As such, the optimum amount of air extraction is different from prior art IGCC air extraction. Embodiments of the power block 124 used for polygeneration applications, including heating, cooling and electricity production, will also use a different optimum amount of air extraction than prior art IGCC.

The all-steam gasification with carbon capture system 100 of FIG. 1 includes the key subsystems necessary to gasify a solid or liquid fuel. The solid fuel coal is used to illustrate the teaching, but it is understood that numerous other solid fuels could be used. Furthermore, alternative embodiments may contain only some of the subsystems illustrated in the embodiment of FIG. 1, as would be well known to those familiar with the state of the art. For example, in embodiments in which power only is required, the coal-to-liquid 120 system is omitted. In embodiments that require only coal-to-liquid, or solid fuel-to-liquid, the power block 124 may be omitted depending up on the configuration.

Figure 2:
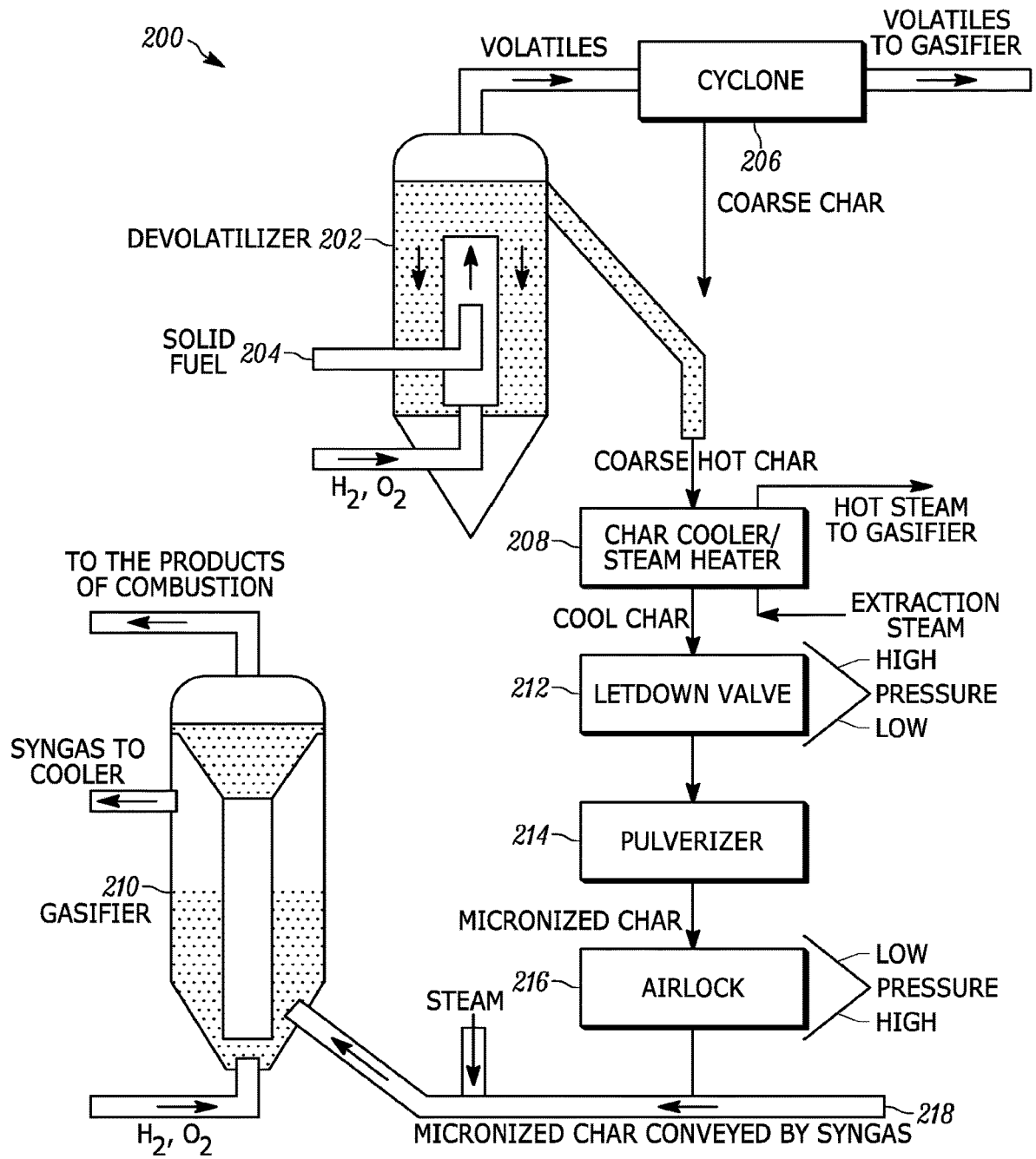
FIG. 2 illustrates an embodiment of a char preparation system and a gasifier system of the present teaching.

FIG. 2 illustrates an embodiment of a char preparation system and a gasifier system 200 of the present teaching. A devolatilizer 202 takes in a solid fuel, such as crushed coal 204. The crushed coal 204 is combined with $H_2$ and $O_2$ in the devolatilizer 202. Volatiles from the devolatilizer 202 are sent to a cyclone 206 that produces coarse char that is sent to a char cooler/steam heater 208. The cyclone 206 sends volatiles to a gasifier 210. The overhead gasses from the cyclone 206 are sent to the gasifier 210 thereby using equilibrium to minimize the formation of CH4, etc. Char entrained in the volatiles leaving the devolatilizer 202 overhead are captured by the cyclone 206 and then returned to the char cooler/steam heater 208.

The devolatilizer 202 provides coarse hot char to the char cooler/steam heater 208. The char is cooled by steam in a counter-flow heat exchanger of the char cooler/steam heater 208. The cool char is produced using extraction steam. The char cooler/steam heater 208 releases hot steam to the gasifier for reuse. The char temperature is determined by the pulverizer's thermal operating limit. The steam is pre-cooled to the char temperature before entering the heat exchanger in the char cooler/steam heater 208. The steam at the outlet of the heat exchanger is ducted to the gasifier 210, where the high-temperature steam reduces the fuel needed for heating the gasifier 210.

In some embodiments, a devolatilizer additive is injected into the devolatilizer that neutralizes the effect of sodium-based contaminants. The additive protects the char cooler/steam heater 208 from forming deposits. In particular, the devolatilizer additive prevents and reduces undesirable deposits that are common in prior art integrated gasification combined cycle (IGCC) coolers and candle filters.

Char leaving the heat exchanger of the char cooler/steam heater 208 is then depressurized through a letdown valve 212 to maintain the system within the pulverizer's pressure operating limits. The cool char from the char cooler/steam heater 208 passes through the letdown valve 212 to a pulverizer 214. The char is further processed in the pulverizer 214 to crush the char particles to less than 8 microns.

In some embodiments, an electrostatic separator downstream of the pulverizer 214, may also be used to reduce the ash concentration in the char stream. Removing ash under the pulverizer 214 advantageously reduces the filtration required by the candle filters in the heat exchanger's warm-gas cleanup system. This is true even if the ash is not completely removed. The very small size of the char particles reduces the filtration efficiency. The operating life of the filters in the warm-gas cleanup system is lower because the high pressure drop through the filter cake of small particles increases the required cleaning frequency.

At the output of the pulverizer 214, the char is returned to the operating pressure of the gasifier 210 through the use of an airlock 216 and the syngas conveying system 218. In the syngas conveying system 218, aerosol char is conveyed by syngas. Referring back to FIG. 1, the gasifier 210 sends syngas to a syngas cooler 112. The gasifier 210 is also connected to the products of combustion system 110.

Figure 3:
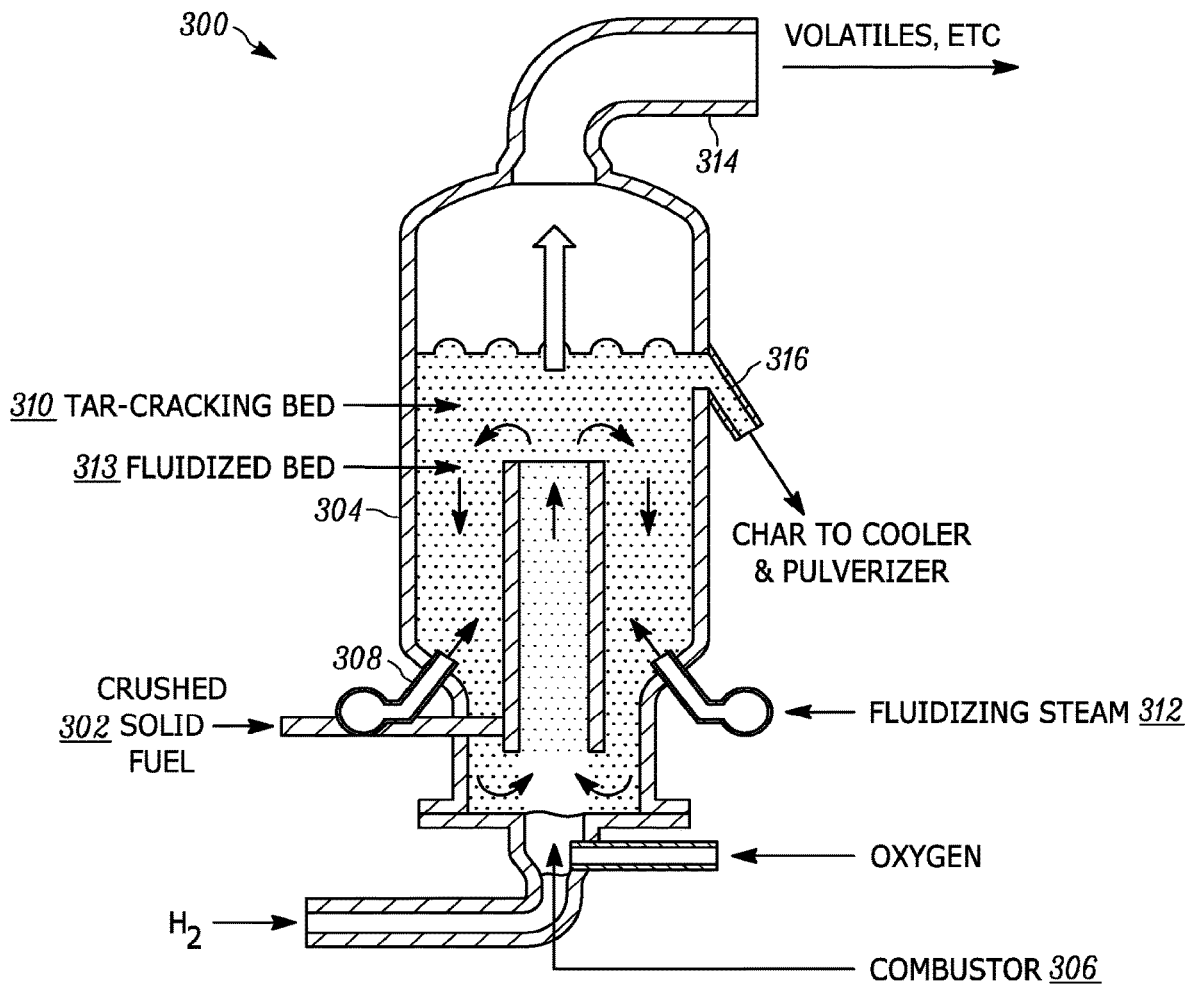
FIG. 3 illustrates an embodiment of a devolatilizer of the present teaching.

FIG. 3 illustrates an embodiment of a devolatilizer 300 of the present teaching. Referring to FIGS. 1 and 3, the devolatilizer 300 is situated within the char preparation system 104. The devolatilizer 300 produces the char by a pyrolysis process. Pyrolysis is a thermal and chemical decomposition of an organic material that takes place at high temperature in the absence of oxygen. The devolatilizer of the present teaching is similar to the ICFB developed in the 1970's by Westinghouse at their Waltz Mills Research facility.

Crushed coal 302 or another solid fuel is first fed into a reactor 304. Hydrogen and oxygen are input and burned using a combustor 306 at the bottom of the reactor 304. The burning is followed by mixing with returning hot solids. Fresh coal is fed into the draft tube 308 near the bottom of the reactor 304, and is heated by the circulating hot solids. A bed 310 of char forms above the outlet of the draft tube, which prevents penetration of a high velocity jet emerging from the draft tube, thereby minimizing the elutriation of particles from the devolatilizer. The overhead bed 310 also thermally cracks the tars in the volatiles, rendering them into gaseous hydrocarbons such as methane. Steam 312 is used to fluidize the bed. Oxygen is used instead of air in the devolatilizer to avoid the contamination of the volatiles by the nitrogen from the air. This allows the syngas to be used for polygeneration or to produce coal-to-liquids. Char entrained in the volatiles leaving the devolatilizer overhead 314 are captured by a cyclone and returned to the char preparation system while the majority of the char leaves the devolatilizer through the overflow pipe 316 of the reactor 304.

Figure 4:
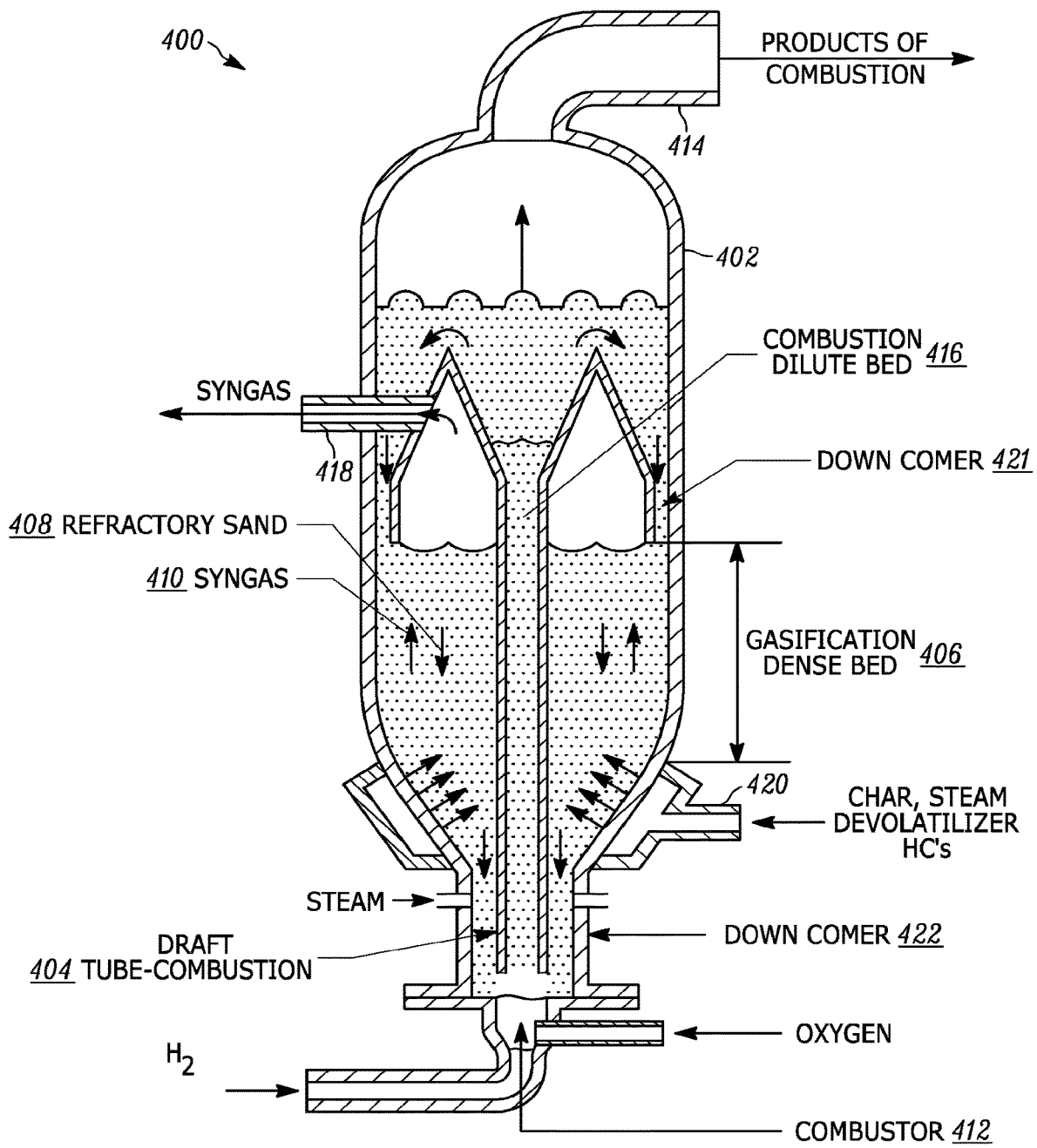
FIG. 4 illustrates an embodiment of an indirect gasifier of the present teaching.

FIG. 4 illustrates an embodiment of an indirect gasifier 400 of the present teaching. The embodiment of the indirect gasifier 400 of FIG. 4 is an internally-circulating fluidized bed (ICFB). The ICFB uses a single pressure vessel reactor 402 for combustion and gasification. This single pressure vessel reactor 402 simplifies operation and reduces equipment size. The pressure vessel reactor 402 comprises a vertical tube, also called a draft tube 404, at the center of the reactor. The flow of gases in the draft tube 404 is upwards, while the flow of solids in the fluidized bed-of-dense-solids 406 surrounding the draft tube 404, is downwards. The fluidized bed-of-dense-solids 406 is designed to be deep enough to fully devolatilize the coal, so all of the volatiles are released.

Fuel and combustion air are injected into the entrance of the draft tube 404, which reduces the density of the flowing stream there, compared with that of the dense-fluidized-bed reactor surrounding it. This creates a pressure difference at the bottom of the draft tube that causes the bed-of-dense-solids 406 in the annular section to flow downward, where they are entrained by the gases flowing up the draft tube 404, thereby causing the continuous circulation of hot solids around inside the reactor 402. The bed-of-dense-solids 406 is sometimes referred to as the annular bed. The solids comprising the fluidized dense-bed-of-solids 406 are a relatively high-density refractory sand 408, such as alumina. The high density increases the circulation rate, and thereby, the amount of heat than can be circulated. The circulation flow can be as much as 100-times the flow of fuel, or syngas 410. A high circulation rate is desirable as it limits the temperature change of bed material as flows from one section of the reactor to the other.

The indirect gasifier 400 mixes micronized char with steam, at a high-enough temperature to convert them to hydrogen and carbon monoxide, by the so-called water-gas reaction. The heat of reaction is provided by the combustion of hydrogen and air in the combustor 412 at the bottom of the gasifier 400. The products of combustion quickly mix with hot circulating solids flowing down into the mixer. The mixture of hot solids and the products of combustion then flow up through the draft tube. At its top, the solids fall back onto the surrounding fluidized dense-bed-of-solids 406, while the products of combustion exit through the vent 414 at the reactor's top. A funnel shape at the top of the draft tube 404 allows a dilute bed 416 to form that prevents the elutriation of particles into the freeboard.

The heat of combustion keeps the bed material hot, to provide the heat of gasification, which occurs in the annular bed, or dense-bed-of-solids 406. Solids flow downwards there, while the char and steam, and then the hydrogen and carbon monoxide (syngas) made from the steam-char reaction—flow upwards. These upward flowing gases leave through the opening 418 in the side of the reactor 402. Care is taken that the two outlet streams exiting the vent 414 and the opening 418 never mix, otherwise the nitrogen in the combustion air would contaminate the syngas, which is unacceptable in coal-to-liquids processes.

Circulation in the reactor 402 occurs because the density of the materials within the draft tube 404, consisting of both gases and hot solids, is lower than that of the dense fluidized material in the dense-bed-of-solids 406 annular bed. This arrangement thusly automatically sustains circulation. The circulating solids are made of high-density refractory sand 408 such as alumina to transfer the heat. The high density is needed to provide a sufficient flow rate of the circulating solids to limit the temperature difference around the loop to an acceptable level, of about 200° F. The refractory sand 408 is fine enough to be fluidized by the flow of syngas 410 created from the steam and micronized char that enter through the distributor plate 420.

In some embodiments, the preferred fuel for the draft tube is hydrogen, as opposed to char. This is because using hydrogen eliminates the need for a cleanup system for the char combustion. In these embodiments, hydrogen with air is ignited in a combustor beneath the entrance of the draft tube, and then mixed with the flow of circulating hot solids. The products of combustion, air and steam are then directed to the power block for multiple purposes.

The top of the draft tube 404 is sloped and extended across the area of the gasifier bed. This geometry both minimizes dead spots, and provides uniform flow across the fluidized bed. The injection of small amounts of steam into the upper down comer 421 prevents the entrainment of products of combustion from being entrained into the syngas 410. The lower down comer 422 is similarly designed to avoid the entrainment products of combustion, by maintaining a flowrate sufficient to overcome the flow of countervailing gases. In various embodiments, any carbon dioxide that has formed in previous reactors of the all-steam gasification and carbon capture system of the present teaching may be absorbed and recovered in various alternative known carbon capture systems.

Figure 5:
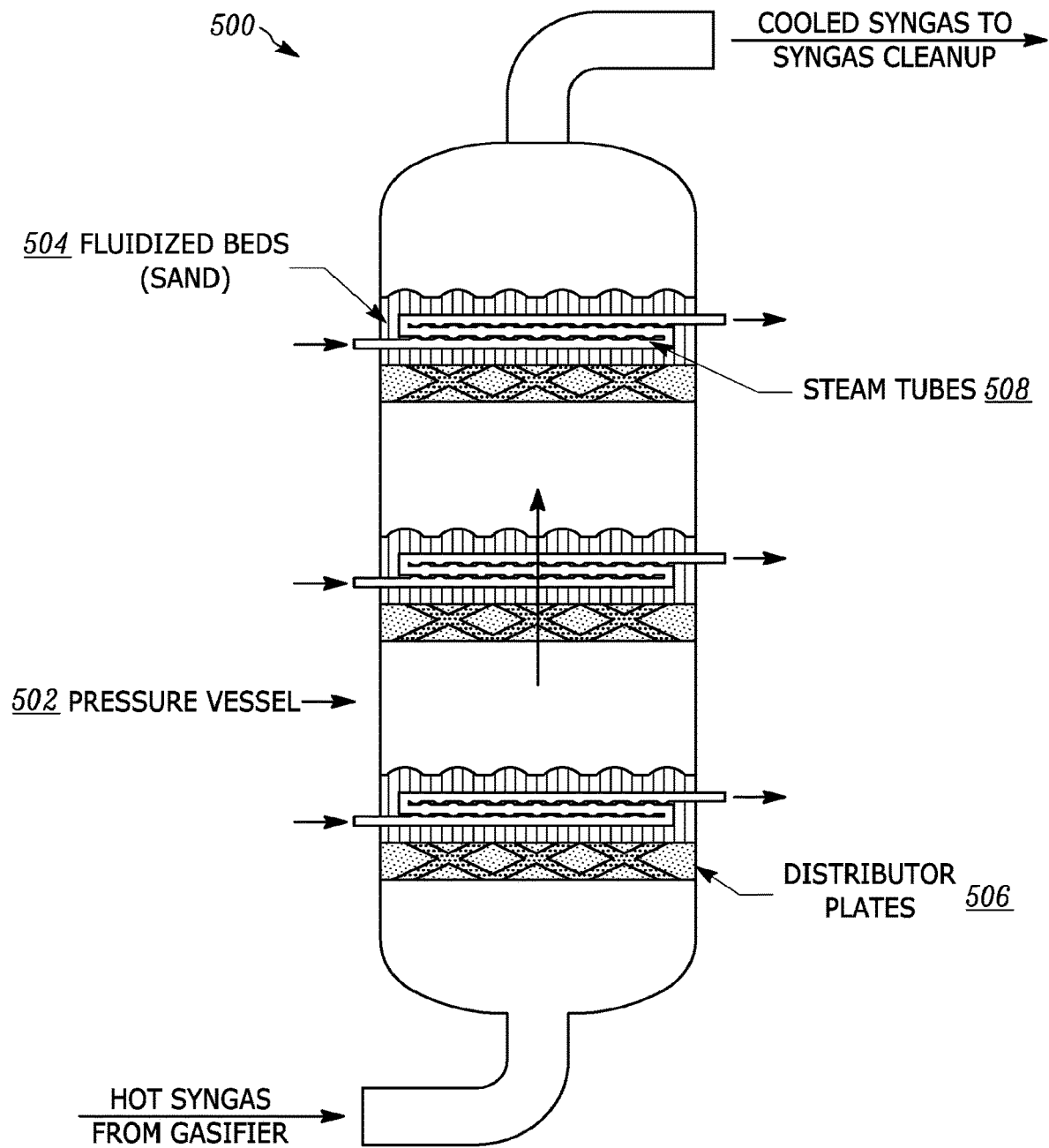
FIG. 5 illustrates an embodiment of a syngas cooler of the present teaching.

FIG. 5 illustrates an embodiment of a syngas cooler 500 of the present teaching. Hot syngas leaving the gasifier is cooled to the temperature required by the syngas cleanup system in the syngas cooler 500. In the embodiment of FIG. 5, a fluidized-bed cooler design is used because it exhibits significantly higher heat transfer coefficients than a conventional fire tube cooler. This feature reduces the heat exchanger's size and cost. The syngas cooler comprises a pressure vessel 502. The syngas cooler houses multiple fluidized beds 504 that are supported by distributer plates 506. Steam tubes 508 are embedded in the fluidized beds 504. The turbulence of a fluidized bed 504 prevents the buildups that can occur in conventional fire tube heat exchangers. The use of more than one bed in the syngas cooler 500, with successive beds flowing upwards operating at lower temperatures, increases the efficiency of the steam turbine used to utilize the waste heat from the syngas cooler 500.

Figure 6:
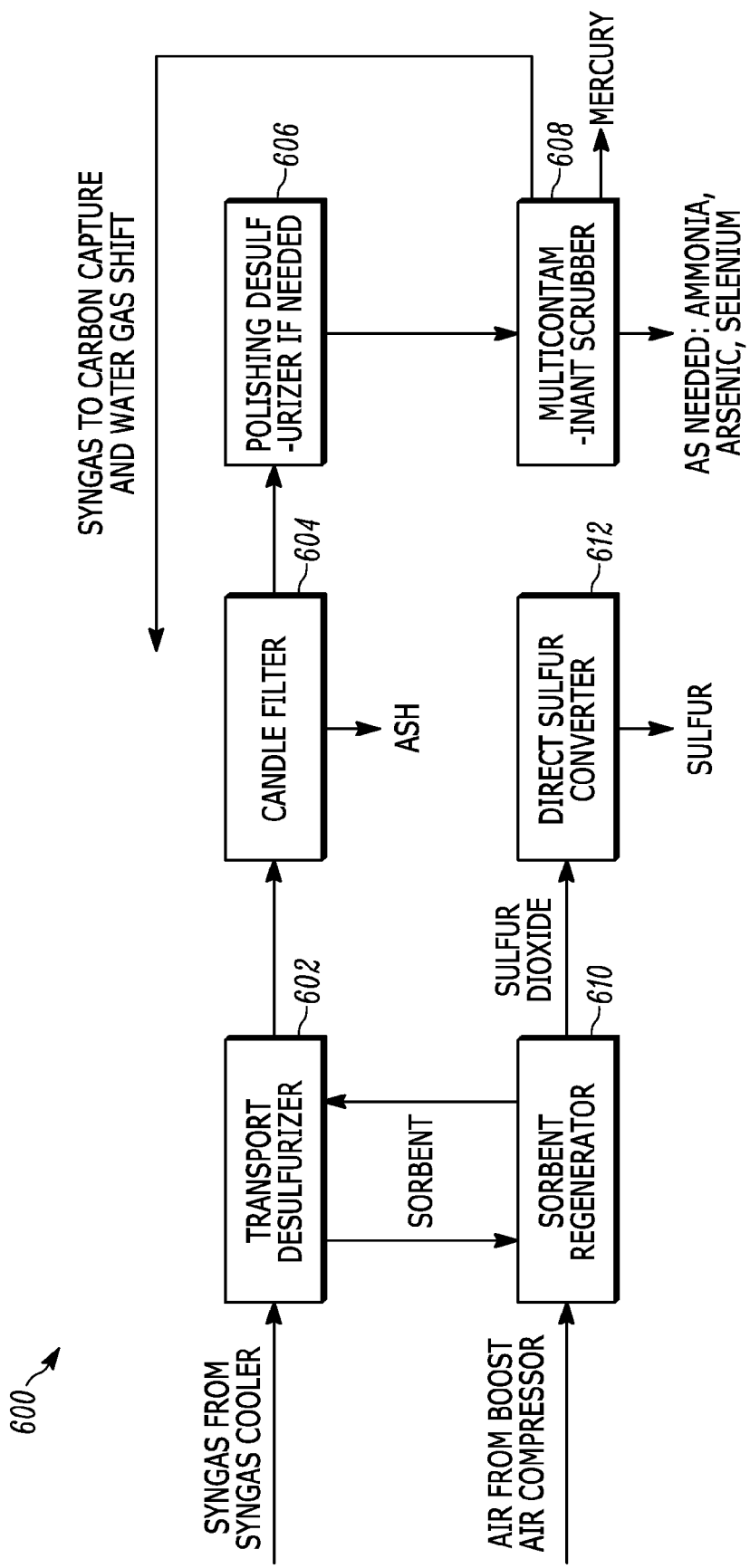
FIG. 6 illustrates an embodiment of a syngas cleanup system of the present teaching.

FIG. 6 illustrates an embodiment of a syngas cleanup system 600 of the present teaching. Syngas from a syngas cooler is input into a transport desulferizer 602, and then passed to a candle filter 604 that removes ash. When needed, the syngas is then passed to a polishing desulferizer 606. Finally a multi-contaminant scrubber 608 is used to remove mercury, and ammonia, arsenic, and selenium as needed. The output of the syngas cleanup system 600 is connected to a carbon capture system with a water gas shift. A sorbent regenerator 610 uses air from a boost air compressor to collect sulfur dioxide that is removed from the transport desulfurizer by a sorbent material. This sulfur dioxide is sent to a direct sulfur converter 612 to produce sulfur.

Some embodiments of syngas cleanup systems of the present teaching use a Warm Gas Cleanup System developed by Research Triangle Institute. This syngas cleanup system has high efficiencies of removing all pollutants, including sulfur, particulate matter, and trace elements, such as ammonia, mercury, selenium, and arsenic. This brings emissions below the strictest levels of EPA standards. The ammonia is removed to minimize NOx emissions. The multi-contaminant system can be located after the Carbon Capture system to allow an optimum temperature fit with the high temperature calcium looping system.

Figure 7:
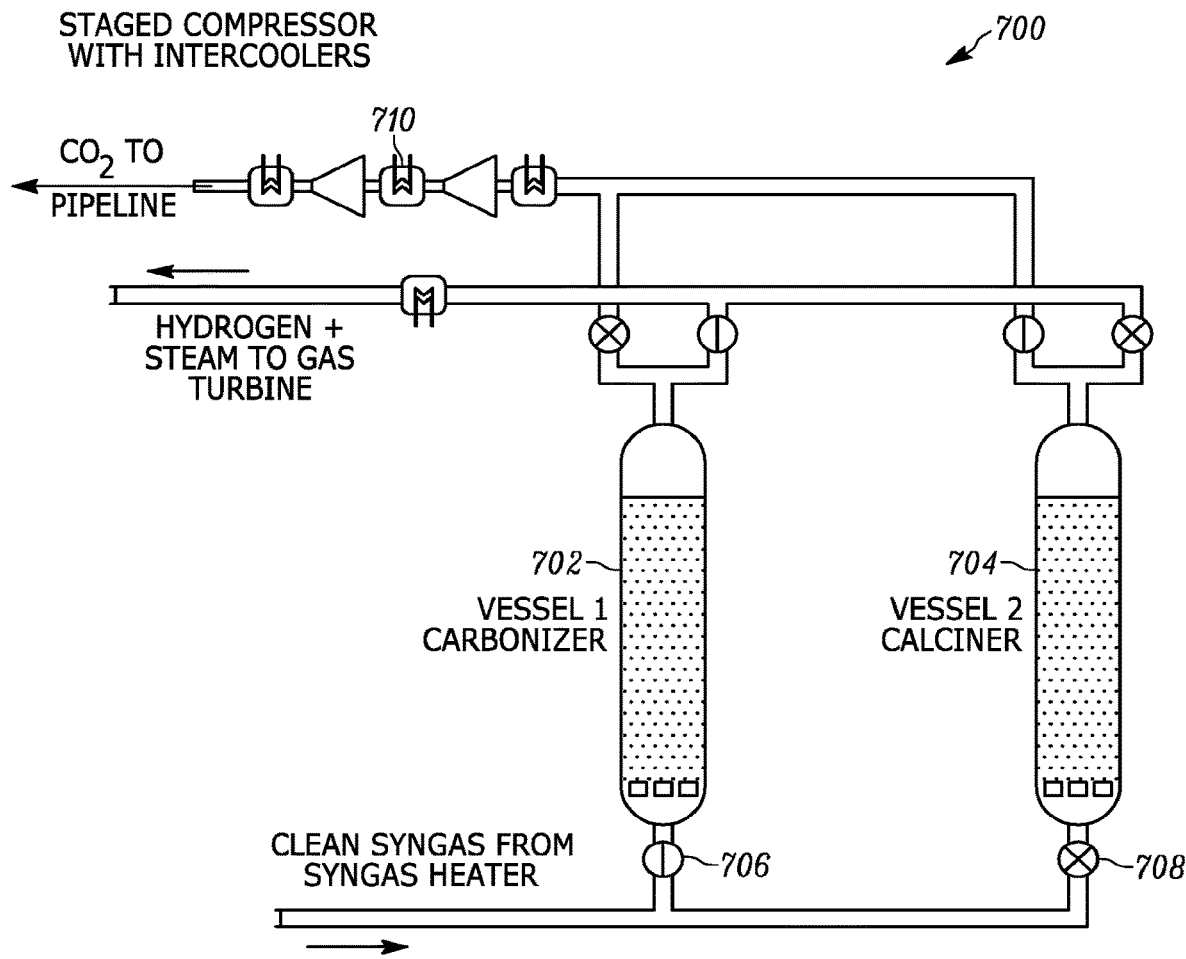
FIG. 7 illustrates an embodiment of a carbon capture reactor system of the present teaching.

FIG. 7 illustrates an embodiment of a carbon capture reactor system 700 of the present teaching. The carbon capture reactor system 700 produces high-hydrogen syngas and carbon dioxide. The carbon capture reactor system 700 uses adiabatic calcium looping. The carbon capture reactor system 700 produces a water-gas shift reaction, a series of heat exchangers and the $CO_2$ compression system. A waster-gas shift reaction is a reaction of carbon monoxide and water vapor to form carbon dioxide and hydrogen (water gas). Methane reforming can also be added, if needed.

In the carbon capture reactor system 700, clean syngas from a syngas cleanup system is sent to a carbonizer 702 and a calciner 704 via valves 706, 708 that automatically control the flow on and off. A combination of adsorption, pressure-swing carbon-capture systems remove the carbon compounds from the syngas. A changeover system during release of the CO2, including appropriate accumulators and high temperature valves, avoids contamination of syngas and CO2 at the end of each cycle. The captured CO2 is cooled and compressed in a stage 710 before being transported away for sequestration in saline aquifers, or for utilization by enhanced oil recovery (EOR) or other uses, such as dry methane reforming. Due to the pressure swing system, a variable compression unit is used to save ⅓ of the compression power.

A sorbent enhanced reaction (SER) in the carbon capture reactor system 700 works because the sorbent removes the $CO_2$ of the shift reaction as soon as it is formed. This creates a very low partial pressure of $CO_2$, which, in accordance with the Le Chatelier principal, and enables the shift reaction to occur at significantly higher temperatures than in the absence of sorbent. Without SER, the shift reaction occurs only at low temperatures, and in the presence of catalysts. The SER allows much higher temperature that makes the heat generated by the shift reaction useful for producing power.

Figure 8:
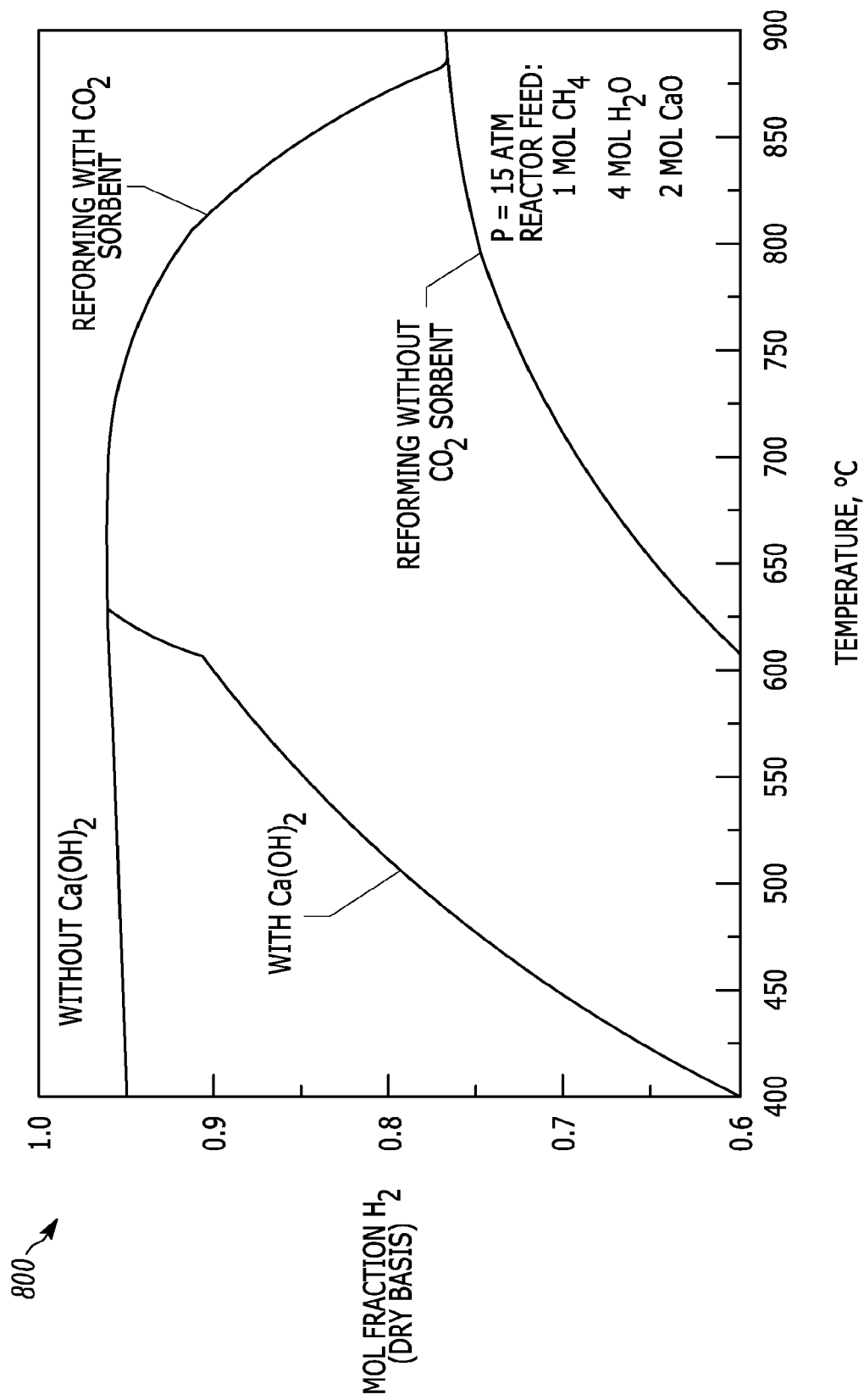
FIG. 8 illustrates a phase diagram of the steam reforming of methane of the present teaching.

FIG. 8 illustrates a phase diagram 800 related to the steam reforming of methane reaction of the present teaching. The steam reforming of methane takes place in a high-temperature shift reactor. If there is methane in the syngas, the methane burns in the gas turbine and forms $CO_2$. The amount of methane produced depends on both the catalytic effect of the ash in the char, the temperature and pressure of the devolatilizer, the amount from the coal-to-liquid plant and the equilibrium in the indirect gasifier. To minimize methane production, the devolatilizer is operated at as high a temperature as is feasible without causing the ash to melt or agglomerate, typically, under 2100° F. If the methane concentration in the syngas is sufficiently high to cause the system to exceed the prescribed $CO_2$ emission limits, it can be steam-reformed to remove as much as 94% of it with the use of catalysts in the carbonator vessel of the Carbon Capture System as can be seen in the data of FIG. 8. A nickel-based catalyst is used in the carbon capture reactor to reform the methane. The syngas must have a very low concentration of sulfur, to avoid poisoning the catalyst.

An optional sulfur polishing unit can be included in the warm-gas clean-up unit to meet that requirement. The process that has all three reactions occurring in a single vessel is referred to as SM-SER, where the "SM" refers to steam methane reforming.

Figure 9:
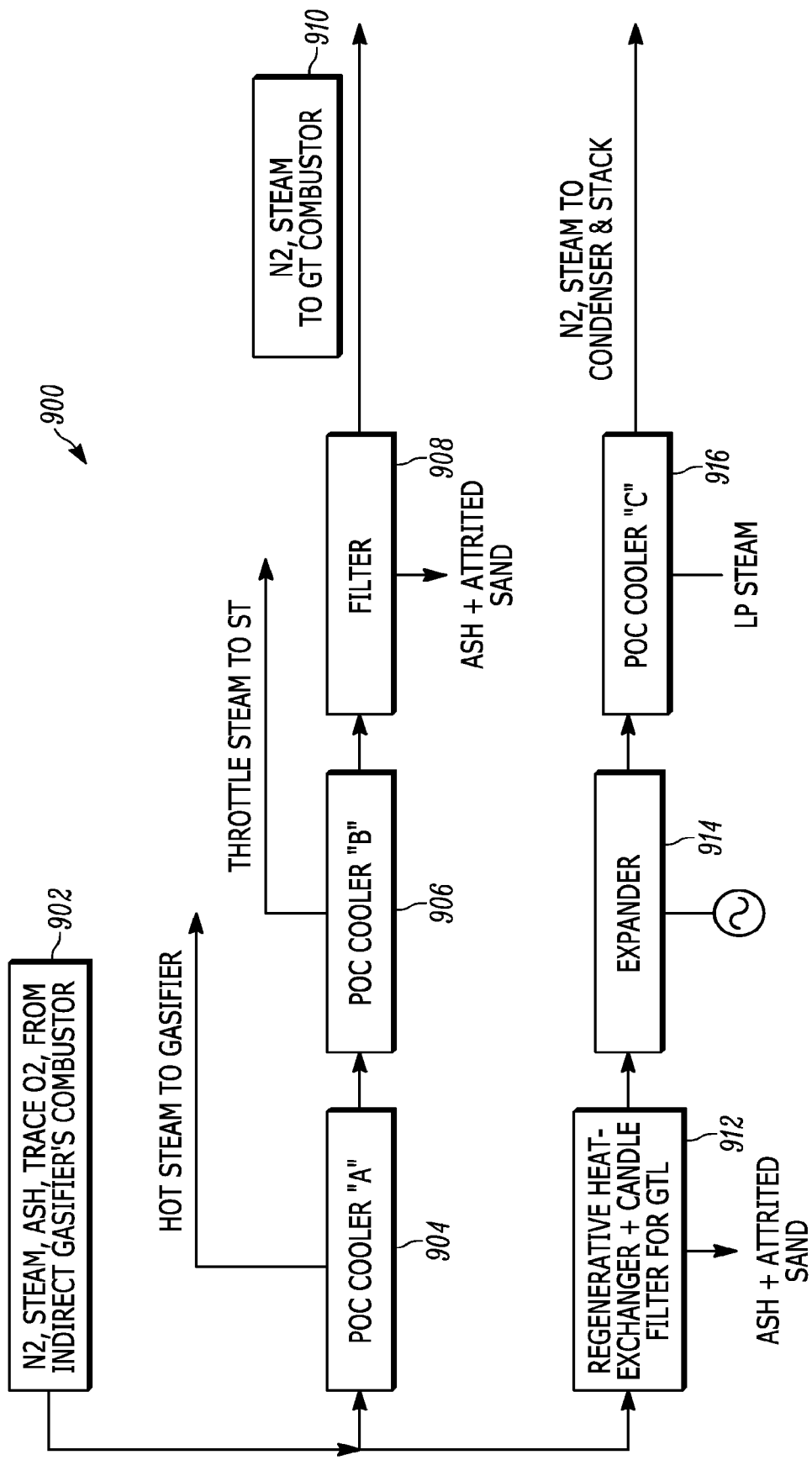
FIG. 9 illustrates an embodiment of products of combustion system for polygeneration applications of the present teaching.

One feature of the present teaching is the ability to use air instead of oxygen, resulting in a significant saving. This is one advantage of using the indirect gasifier when the syngas is used to make chemicals. FIG. 9 illustrates an embodiment of products of combustion system 900 for polygeneration applications of the present teaching. (See also FIG. 1 element 110) A stream 902 of $N_2$, steam, ash, and trace $O_2$ from the indirect gasifier's combustor enters the products of combustion system 900. In the embodiment of FIG. 9, the stream 902 of nitrogen, steam and other materials is split into two streams. The split is proportionate to the power and chemical requirements particular to the polygeneration application. One stream flows through one or more coolers 904, 906. The stream then flows to a filter 908 and on to the gas turbine 910 as diluent for the hydrogen combustion thereby controlling NOx production and creating power augmentation. The second stream, when not needed for power, is re-generatively cooled and filtered using a heat exchanger and candle filter system 912. The second stream is then decompressed in an expander 914 to produce power. The second stream may pass through a cooler 916 and then passes on to the stack. The moisture is condensed and recycled, while the nitrogen is vented into the atmosphere.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A carbonaceous fuel gasification system comprising:
a) a micronized char preparation system comprising a devolatilizer, the micronized char preparation system being configured to pulverize solid carbonaceous fuel to produce micronized char, steam, volatiles, and hydrogen at outlets; and
b) an indirect gasifier, comprising:
i) a vessel comprising a gasification chamber coupled to the micronized char preparation system so that the gasification chamber receives the micronized char from the micronized char preparation system, and coupled to a steam source, the gasification chamber comprising refractory sand and being configured to produce syngas, ash, and steam at one or more outlets; and
ii) a combustion chamber coupled to a source hydrogen and to a source of an oxidant and configured to burn a mixture of the hydrogen and the oxidant to provide heat for gasification and for heating incoming flows, thereby generating steam and nitrogen, wherein the heat for gasification is transferred from the combustion chamber to the gasification chamber by circulating the refractory sand.

2. The carbonaceous fuel gasification system of claim 1 wherein the indirect gasifier further receives volatiles from an outlet of the micronized char preparation system.

3. The carbonaceous fuel gasification system of claim 1 wherein the devolatilizer comprises a heated pressure vessel comprising an inlet for injecting fluidizing steam, and at least one outlet for removing volatiles and coarse char.

4. The carbonaceous fuel gasification system of claim 1 further comprising a cyclone that separates course char from volatiles, the cyclone having a first outlet that is positioned downstream of the devolatilizer that provides coarse char and a second outlet that is coupled to an input of the indirect gasifier.

5. The carbonaceous fuel gasification system of claim 1 wherein the carbonaceous fuel comprises coal.

6. The carbonaceous fuel gasification system of claim 1 wherein the steam and nitrogen generated by the indirect gasifier's combustion chamber are directed to a gas turbine power generation system.

7. The carbonaceous fuel gasification system of claim 1 wherein the steam and nitrogen generated by the combustion chamber of the indirect gasifier are directed to an expander connected to an electrical generator and to stack condensers in a power block, and is then exhausted at a system stack.

8. The carbonaceous fuel gasification system of claim 1 further comprising a syngas cooler having an inlet coupled to an outlet of the gasification chamber, the syngas cooler cooling the syngas, and generating steam at an outlet.

9. The carbonaceous fuel gasification system of claim 8 further comprising a syngas cleanup system having an inlet that receives the cooled syngas from the outlet of the syngas cooler, the syngas clean up system processing the syngas to remove impurities.

10. The carbonaceous fuel gasification system of claim 9 further comprising a carbon capture system having an input that is coupled to an outlet of the syngas clean up system, the carbon capture system generating carbon dioxide and hydrogen.

11. The carbonaceous fuel gasification system of claim 10 wherein the carbon capture system comprises a carbon capture reactor comprising a nickel-based catalyst that enables excess methane in the syngas to be removed by steam-reforming.

12. The carbonaceous fuel gasification system of claim 11 wherein the syngas cleanup system further comprises a polishing desulfurizer that reduces the $SO_2$ concentration of the syngas to a level that protects the nickel-based catalyst from being poisoned by the sulfur dioxide.

13. The carbonaceous fuel gasification system of claim 11 wherein the nickel-based catalyst is mounted on the surface of a sorbent assembly.

14. The carbonaceous fuel gasification system of claim 11 wherein the carbon capture system uses steam to produce a water gas shift reaction.

15. The carbonaceous fuel gasification system of claim 10 further comprising a solid fuel-to-liquids system having an inlet that is coupled to the outlet of the syngas clean up system and to an outlet of the carbon capture system, the solid fuel-to-liquids system receiving syngas and a stream of hydrogen and generating methane at a first output and at least one of diesel oil, methanol, gasoline, and aviation fuel at a second output.

16. The carbonaceous fuel gasification system of claim 15 wherein the indirect gasifier receives volatiles from the output of the micronized char preparation system and the first output of the solid fuel-to-liquids system is coupled to an input of the indirect gasifier, the solid fuel-to-liquids system providing methane to the vessel comprising the gasification chamber in the indirect gasifier.

17. The carbonaceous fuel gasification system of claim 15 further comprising a gas flow controller positioned between the outlet of the syngas clean-up system and the inlet of the solid fuels-to-liquids system, the gas flow controller regulating a carbon monoxide/hydrogen ratio in the syngas.

18. The carbonaceous fuel gasification system of claim 1 wherein the oxidant comprises air.

19. The carbonaceous fuel gasification system of claim 1 wherein the gasification chamber has an inlet that is coupled to an outlet of the micronized char preparation system so that the gasification chamber receives steam from the micronized char preparation system.

20. The carbonaceous fuel gasification system of claim 1 wherein the gasification chamber has an outlet that is coupled to an inlet of a heat recovery system so that the heat recover system receives steam from the gasification chamber.

21. The carbonaceous fuel gasification system of claim 1 wherein the micronized char preparation system further comprises a counter-flow char cooler that preheats steam as it cools the micronized char, a pressure let-down valve, a pulverizer that reduces the average size of the micronized char to under $10\mu$, and an airlock that re-pressurizes the micronized char.

* * * * *